United States Patent [19]

Sprunk

[11] Patent Number: 5,473,693
[45] Date of Patent: Dec. 5, 1995

[54] APPARATUS FOR AVOIDING COMPLEMENTARITY IN AN ENCRYPTION ALGORITHM

[75] Inventor: Eric Sprunk, Carlsbad, Calif.

[73] Assignee: GI Corporation, Hatboro, Pa.

[21] Appl. No.: 167,781

[22] Filed: Dec. 21, 1993

[51] Int. Cl.$^6$ ................................................. H04L 9/14
[52] U.S. Cl. ............................................... 380/29; 380/45
[58] Field of Search .................................. 380/29, 45

[56] References Cited

U.S. PATENT DOCUMENTS

| | | | |
|---|---|---|---|
| 4,157,454 | 6/1979 | Becker | 380/45 |
| 4,223,182 | 9/1980 | Fraser | 380/45 |
| 4,316,055 | 2/1982 | Feistel | 380/45 |
| 4,399,323 | 8/1983 | Henry | 380/45 |
| 4,471,164 | 9/1984 | Henry | 380/45 |
| 4,613,901 | 9/1986 | Gilhousen et al. | 380/29 |
| 4,802,217 | 1/1989 | Michener | 380/29 |
| 5,008,935 | 4/1991 | Roberts | 380/29 |
| 5,142,579 | 8/1992 | Anderson | 380/45 |
| 5,214,701 | 5/1993 | Quisquater et al. | 380/29 |
| 5,222,141 | 6/1993 | Killian | 380/45 |
| 5,231,662 | 7/1993 | van Rumpt et al. | 380/29 |

OTHER PUBLICATIONS

W. L. Tuchman, et al., "Efficacy of the Data Encryption Standard in Data Processing," Proceedings of Compcon '78—Computer Communications Networks, Sep. 5–8, 1978, Washington, D.C., New York, U.S.A., pp. 340–347.

D. W. Davies, et al., "Security for Computer Networks—An Introduction to Data Security in Teleprocessing and Electronic Funds Transfer," John Wiley & Sons, Chichester, Great Britain, pp. 61, 64 & 65.

"Guidelines for Implementing and Using the NBS Data Encryption Standard," *Federal Information Processing Standards Publication 74*, National Bureau of Standards, U.S. Department of Commerce, Apr. 1, 1981, pp. 1–39.

"Announcing the Data Encryption Standard," *Federal Information Processing Standards Publication 46*, National Bureau of Standards, U.S. Department of Commerce, Jan. 15, 1977, pp. 1–18.

*Primary Examiner*—Salvatore Cangialosi
*Attorney, Agent, or Firm*—Barry R. Lipsitz

[57] ABSTRACT

An implementation of a security algorithm such as DES is provided that overcomes the complementarity weaknesses provided by conventional implementations. In a DES implementation, a cryptographic processor applies the DES algorithm to a data block. The DES processor includes a first input port for receiving the data block, a second input port for receiving a cryptographic key, and an output port for outputting the data block after encryption. A nonlinear function that does not have complementarity is applied to at least one of the ports. The nonlinear function can comprise a lookup table, which could be advantageously derived from a DES S-Box.

18 Claims, 1 Drawing Sheet

APPARATUS FOR AVOIDING COMPLEMENTARITY IN AN ENCRYPTION ALGORITHM

BACKGROUND OF THE INVENTION

The present invention relates generally to security apparatus for information processing systems and more particularly to apparatus for implementing an encryption algorithm without a complementarity property. The invention is particularly applicable to the secure transmission of scrambled television signals, although it is by no means limited to such use.

There are many schemes available for controlling the remote descrambling of television signals. Such schemes are necessary to maintain security in subscription television systems, including cable television systems and satellite television systems. Typically, a system subscriber is provided with a descrambler connected between a television signal source (e.g., cable feed or satellite receiver) and a television set. Each subscriber's descrambler is remotely accessed by the system operator to enable or disable the receipt of specific services such as the Home Box Office movie channel or special pay-per-view sports events. One problem with such systems is that "pirates" are apt to break the system security and sell "black boxes" that enable the reception of all programming without paying for the services received. It has been difficult and expensive for system operators to contend with the piracy problem. Once a particular security system is breached, the system operator must usually replace all existing descramblers with new units that operate with a different security algorithm. This solution is not cost effective.

Various systems have been designed to make piracy more difficult. One such system is disclosed in U.S. Pat. No. 4,613,901 to Gilhousen, et al. entitled "Signal Encryption and Distribution System for Controlling Scrambling and Selective Remote Descrambling of Television Signals." In the Gilhousen, et al. system, a "working key" signal is generated in accordance with the well known DES security algorithm, after the algorithm is keyed by either a common category key signal or some other key signal. A unique encryption key stream is generated by processing an initialization vector signal in accordance with the DES algorithm when the algorithm is keyed by the working key signal. A television signal is scrambled in accordance with the unique encryption key stream to provide a scrambled television signal. A plurality of unique encrypted category key signals individually addressed to different selected subscribers' descramblers are generated by processing the initial common category key signal in accordance with the DES algorithm when the algorithm is keyed by a plurality of different "unit key" signals associated with different descramblers. The scrambled television signal, initialization vector signal, and plurality of encrypted category key signals are broadcast to the descramblers. At each descrambler, the encryption key stream is reproduced to descramble the television signal. Each descrambler has its unique unit key signal stored in memory for use in reproducing the common category key signal when the descrambler is addressed by its unique encrypted category key signal. By using the DES algorithm, the Gilhousen, et al. system provides a high level of security, making it difficult and expensive for a pirate to reproduce the working key.

The reliance on the DES algorithm by security systems such as Gilhousen, et al. renders such systems vulnerable to attack should the DES security ever be breached. Although no one has publicly broken the DES algorithm to date, a weakness has been discovered. The weakness stems from the "complementarity property" of encryption algorithms such as the DES algorithm. Although this weakness does not allow the algorithm to be broken, additional security would be provided, particularly in the key hierarchies disclosed by Gilhousen, et al., if the complementarity property were eliminated.

As a result of the complementarity property, the output of an encryption processor will be inverted if both the data and secure key input to the processor are inverted. This can be described mathematically as follows:

$$E_K[X]=Y \rightarrow E_{\overline{K}}[\overline{X}]=\overline{Y}$$

where

X is the data to be encrypted;

K is the secure encryption key; and

Y is the encrypted data.

Such complementarity is the only known property of DES that is remotely linear. Those skilled in the art will appreciate that the presence of a linear property in a security algorithm such as DES has the potential for compromising the security provided by the algorithm.

A detailed discussion of the DES algorithm can be found in *Federal Information Processing Standards Publication 46* ("*FIPS Pub.* 46") issued by the National Bureau of Standards, United States Department of Commerce, "Announcing the Data Encryption Standard," Jan. 15, 1977 and *FIPS Pub.* 74, "Guidelines for Implementing and Using the NBS Data Encryption Standard," Apr. 1, 1981. Section 3.6 of *FIPS Pub.* 74, "Characteristics of the DES Algorithm," paragraph 4, lines 5–7, implicitly recognizes the complementarity property. The property is also mentioned in Davies, Donald W., "The Security of Data in Networks," *IEEE Catalog No. EH*0183-4, 1981, p. 7.

It would be advantageous to provide apparatus for implementing encryption algorithms without complementarity. Such encryption algorithms would include DES, as well as any other encryption or hashing function that possesses complementarity. The present invention provides such apparatus.

SUMMARY OF THE INVENTION

In accordance with the present invention, apparatus is provided for securing data communication using the Data Encryption Standard or any encryption or hashing algorithm possessing a complementarity property. Cryptographic means apply the algorithm to a data block. The cryptographic means include a first input port for receiving the data block, a second input port for receiving a cryptographic key, and an output port for outputting the data block after processing by the algorithm based on said key. Means are coupled to at least one of the ports for applying, externally of the cryptographic means, a function that does not have complementarity. This function can also be nonlinear.

The means for applying said function can comprise a lookup table. The lookup table can be derived from any function that does not have complementarity. For example, the lookup table can be derived from a DES substitution box ("S-Box").

The means for applying said function can be coupled to the first input port, the second input port, the output port, or any combination thereof. Further, where a function is applied to more than one of the ports, these ports can have the same function or different functions applied thereto.

The apparatus of the present invention is provided at both the transmitter for enciphering the data stream and the receiver for deciphering the data stream. By applying the function without complementarity externally of the cryptographic means, the cryptographic strength of the applied encryption or hashing algorithm (e.g., DES) is not decreased in any way.

DETAILED DESCRIPTION OF A PREFERRED EMBODIMENT

The present invention overcomes the potential weakness of any encryption algorithm or hashing function that possesses a complementarity property. Complementarity is believed to be the only remotely linear property of the DES algorithm, for example, and results in the inversion of the output if the input data stream and key are inverted.

Figure 1:
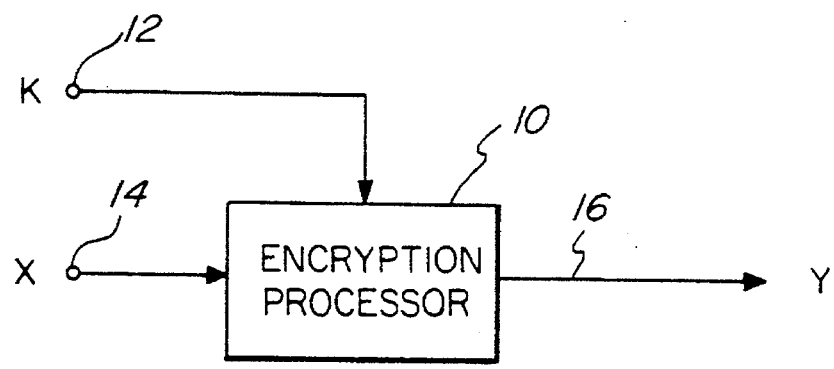
FIG. 1 is a block diagram illustrating a prior art implementation of an encryption algorithm.

FIG. 1 illustrates a prior art implementation of an encryption algorithm such as the DES algorithm. The algorithm is provided by an encryption processor 10, well known in the art. The encryption processor receives a block of data "X" to be encrypted via terminal 14. A cryptographic key "K" is input via terminal 12. The data block X encrypted by key K is output from the encryption processor 10 via line 16 as encrypted signal Y. In the following description, encryption processor 10 is a DES processor, although any other encryption algorithm having complementarity can be substituted and its security enhanced in accordance with the present invention.

The encryption process provided by a DES implementation of FIG. 1 can be represented mathematically as:

$$Y = X \oplus E_K[X].$$

Due to the complementarity of the DES algorithm, the inverse also holds true, such that:

$$\overline{Y} = \overline{X} \oplus E_{\overline{K}}[\overline{X}].$$

Figure 2:
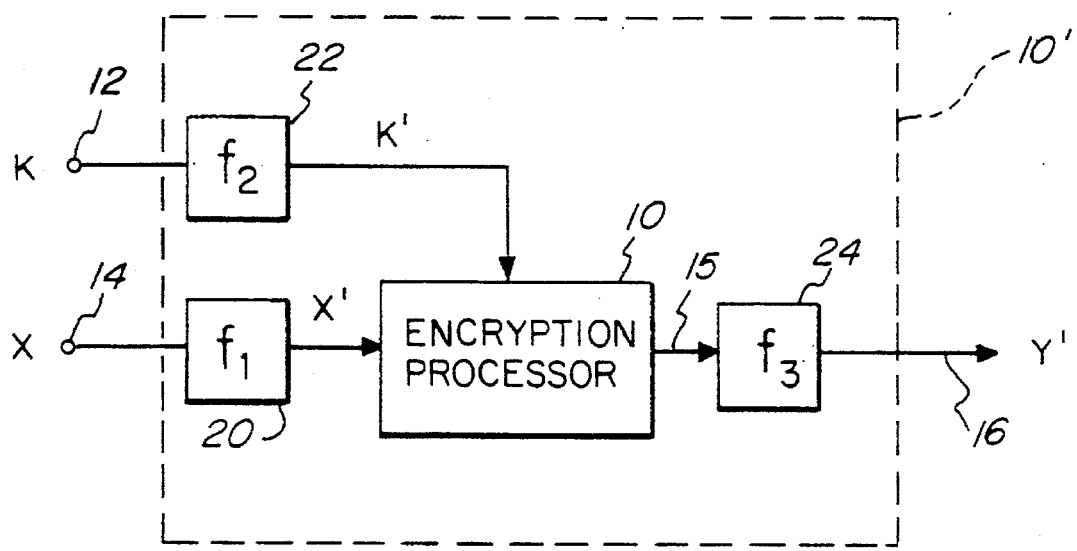
FIG. 2 is a block diagram of apparatus implementing the encryption algorithm in accordance with the present invention.

In order to overcome the complementarity property, which could compromise communication security, the present invention applies a function that does not have complementarity externally of the DES processor. A preferred implementation, in which a nonlinear function without complementarity is applied to each of the data stream, the encryption key, and the output from the encryption processor, is illustrated in FIG. 2. A first nonlinear function $f_1$ is applied to the data stream X by a lookup table or digital circuit 20. A second nonlinear function $f_2$ is applied to the encryption key K via lookup table or circuit 22. The resultant data stream X' and encryption key K' are processed by processor 10 to encrypt the data stream X' for output via line 15. A third nonlinear function $f_3$ is applied to the encrypted output via a lookup table or digital circuit 24. The result is the final output Y' on line 16. It is noted that in order to implement the present invention, the encryption processor 10 of FIG. 1 is simply replaced with the circuit 10' of FIG. 2.

Although FIG. 2 illustrates the application of nonlinear functions by lookup tables or digital circuits 20, 22 and 24, it is not necessary to provide all three of the lookup tables or circuits illustrated. Indeed, just one function that does not have complementarity could be applied at any of the three locations shown in FIG. 2. Where a function is applied at more than one location as illustrated, either the same function without complementarity can be applied at each location or a different function without complementarity can be used at each different location. Thus, $f_1$, $f_2$ and $f_3$ could all be the same function or could all be different functions, or any combination thereof.

The function(s) used in accordance with the present invention can be provided in various ways. As indicated above, such functions can comprise a lookup table or appropriate logic that produces a function for which the complementarity property does not hold. In a preferred embodiment, a table lookup that is not a simple inversion is used. In order to provide the desired result, the function performed by the table must not be reversible via an XOR operation. The table must also be one-to-one, such that it has one output for each input. By providing a table that is one-to-one, it will be reversible (e.g., at a decoder) via an inverse table.

There are many choices for such a lookup table. The minimum requirement is to provide one of the 24 versions (4!) of a one-to-one two-bit lookup table. Three satisfactory example tables from this set of 24 are:

| EXAMPLE 1 | | EXAMPLE 2 | | EXAMPLE 3 | |
|---|---|---|---|---|---|
| In | Out | In | Out | In | Out |
| 00 | 00 | 00 | 01 | 00 | 00 |
| 01 | 01 | 01 | 00 | 01 | 10 |
| 10 | 11 | 10 | 10 | 10 | 01 |
| 11 | 10 | 11 | 11 | 11 | 11 |

It can be seen from the above that a simple XOR cannot reverse the effects of the simple substitutions provided by the example tables. In implementing the present invention, a standard DES S-Box can be used to provide a nonlinear function that does not have complementarity.

The Data Encryption Standard published in *FIPS Pub.* 46 referred to above specifies eight primitive functions (i.e., substitution boxes) S1, . . . S8, each comprising a matrix of 64 values provided in four rows of 16 columns. The first one of these matrices (S-Box $S_1$) is reproduced below:

| $S_1$ | | | | | | | | | | | | | | | |
|---|---|---|---|---|---|---|---|---|---|---|---|---|---|---|---|
| 14 | 4 | 13 | 1 | 2 | 15 | 11 | 8 | 3 | 10 | 6 | 12 | 5 | 9 | 0 | 7 |
| 0 | 15 | 7 | 4 | 14 | 2 | 13 | 1 | 10 | 6 | 12 | 11 | 9 | 5 | 3 | 8 |
| 4 | 1 | 14 | 8 | 13 | 6 | 2 | 11 | 15 | 12 | 9 | 7 | 3 | 10 | 5 | 0 |
| 15 | 12 | 8 | 2 | 4 | 9 | 1 | 7 | 5 | 11 | 3 | 14 | 10 | 0 | 6 | 13 |

Such an S-Box is addressed with a six-bit input (one of sixty-four entries in the matrix) to provide a four-bit output (a value between zero and fifteen). One could view the S-Box as two-bit paged lookups of four bits, where each page contains sixteen of the S-Box values. As long as each of the four pages per S-Box maintain the property of not being reversible by an XOR operation, any of them could be used as a nonlinear function in implementing the present invention. The S-Box illustrated above ($S_1$) has this desirable property. This can be verified by examining the table itself. Note, for example, that the XOR of the zeroth entry (value of fourteen represented as 1110) and fifteenth entry (value of seven represented by 0111) is not the same as the XOR of the seventh entry (value of eight—represented by 1000) and the eighth entry (value of three—represented by 0011).

Since the S-Boxes are already stored in the DES processor, it is efficient to use pages thereof to provide the functions 20, 22 and/or 24 illustrated in FIG. 2. Of course, any other lookup table or logic function that meets the requirement of not having complementarity can be used instead.

In order to avoid any possibility of reducing the cryptographic strength of the encryption algorithm (e.g., DES) used with the present invention, it is necessary that the functions 20, 22 and/or 24 be placed before an encryption operation, after the encryption operation, or both. As illustrated in FIG. 2, placing the function between the actual input key and the key used by the encryption operation is equally valid and is equivalent to a one-to-one substitution of keys. In the preferred embodiment illustrated, wherein a function without complementarity is applied to the actual input key K in addition to the data stream X and the output of the encryption processor, unpredictable key-dependent behavior is produced with no complementarity, maximizing the strength of the system.

It should now be appreciated that the present invention provides a scheme for implementing an encryption algorithm such as DES, without a complementarity property. A function without complementarity is provided external to the actual DES (or other encryption) processing. The function can be provided prior to encryption processing, after encryption processing, and/or to the security key that is input to the encryption processor.

Although the invention has been described in connection with a preferred embodiment thereof, those skilled in the art will appreciate that numerous adaptations and modifications may be made thereto without departing from the spirit and scope of the invention as set forth in the claims.

I claim:

1. A method for enhancing the security of a block security algorithm that has a complementarity property,
   said algorithm receiving a data block at a first input, receiving a cryptographic key at a second input, and outputting said data block at an output after processing by said algorithm based on said key,
   said complementarity property causing the output of the algorithm to be inverted if both said data block and said cryptographic key input to the algorithm are inverted, thereby compromising the security of said algorithm,
   comprising the step of:
   applying a nonlinear function to at least one of said first input, said second input and said output, said nonlinear function being applied at a point external to said algorithm to eliminate the effects of said complementarity by precluding an inversion of said data block and key from inverting an output of said algorithm downstream of said nonlinear function.

2. A method in accordance with claim 1 wherein said nonlinear function is derived from a DES S-Box.

3. A method in accordance with claim 1 wherein said applying step applies said nonlinear function to said first input.

4. A method in accordance with claim 1 wherein said applying step applies said nonlinear function to said second input.

5. A method in accordance with claim 1 wherein said applying step applies said nonlinear function to said output.

6. A method in accordance with claim 1 wherein said applying step applies a nonlinear function to each of said first and second inputs.

7. A method in accordance with claim 6 wherein said applying step applies the same nonlinear function to each of said first and second inputs.

8. A method in accordance with claim 6 wherein said applying step applies a different nonlinear function to each of said first and second inputs.

9. A method in accordance with claim 1 wherein said applying step applies a nonlinear function to each of said first input and said output.

10. A method in accordance with claim 9 wherein said applying step applies the same nonlinear function to each of said first input and said output.

11. A method in accordance with claim 9 wherein said applying step applies a different nonlinear function to each of said first input and output.

12. A method in accordance with claim 1 wherein said applying step applies a nonlinear function to each of said second input and said output.

13. A method in accordance with claim 12 wherein said applying step applies the same nonlinear function to each of said second input and said output.

14. A method in accordance with claim 12 wherein said applying step applies a different nonlinear function to each of said second input and said output.

15. A method in accordance with claim 1 wherein said applying step applies a nonlinear function to each of said first and second inputs and said output.

16. A method in accordance with claim 15 wherein said applying step applies the same nonlinear function to each of said first and second inputs and said output.

17. A method in accordance with claim 15 wherein said applying step applies at least two different nonlinear functions.

18. A method in accordance with claim 1 wherein said block security algorithm comprises the Data Encryption Standard (DES) algorithm.

* * * * *